United States Patent
Yim et al.

(10) Patent No.: US 10,756,599 B2
(45) Date of Patent: Aug. 25, 2020

(54) OIL CIRCULATION TYPE MOTOR AND ECHO VEHICLE INCLUDING THE SAME

(71) Applicants: Hyundai Motor Company, Seoul (KR); Kia Motors Corporation, Seoul (KR)

(72) Inventors: Jeong-Bin Yim, Incheon (KR); Jeong-Min Shin, Suwon-si (KR); Hyun-Jun Soh, Seongnam-si (KR); Seong-Yeop Lim, Seoul (KR); Young-Jun Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 85 days.

(21) Appl. No.: 15/839,471

(22) Filed: Dec. 12, 2017

(65) Prior Publication Data
US 2019/0097499 A1  Mar. 28, 2019

(30) Foreign Application Priority Data
Sep. 26, 2017  (KR) .......................... 10-2017-0123929

(51) Int. Cl.
*H02K 9/19* (2006.01)
*H02K 1/20* (2006.01)
(Continued)

(52) U.S. Cl.
CPC .............. *H02K 9/19* (2013.01); *H02K 1/20* (2013.01); *H02K 3/24* (2013.01); *H02K 3/325* (2013.01);
(Continued)

(58) Field of Classification Search
CPC ... H02K 9/19; H02K 1/20; H02K 7/006; H02K 5/20; H02K 3/24; H02K 3/325; H02K 2203/12
(Continued)

(56) References Cited

U.S. PATENT DOCUMENTS 6,515,384 B1 *  2/2003  Kikuchi ................... H02K 1/20
                                                310/54
9,601,959 B2 *  3/2017  Shirai ..................... H02K 3/522
(Continued)

FOREIGN PATENT DOCUMENTS

DE   10 2016 215 661 A1   3/2017
EP    1 215 800 A2        6/2002
(Continued)

OTHER PUBLICATIONS

European Search Report dated Sep. 26, 2018, for European Patent Application No. 18162520.3.
(Continued)

*Primary Examiner* — John K Kim
(74) *Attorney, Agent, or Firm* — Morgan, Lewis & Bockius LLP (57) ABSTRACT

An oil circulation type motor may include an oil circulating device having cooling oil chambers which are formed along the circumference of a stator core and through which cooling oil pumped by an oil pump is introduced and discharged, wherein cooling oil is introduced into the cooling oil chambers, wets a stator coil wound around the stator core, and is then discharged from the cooling oil chambers.

9 Claims, 8 Drawing Sheets

(51) Int. Cl.
*H02K 7/00* (2006.01)
*H02K 5/20* (2006.01)
*H02K 3/24* (2006.01)
*H02K 3/32* (2006.01)

(52) U.S. Cl.
CPC ............... *H02K 5/20* (2013.01); *H02K 7/006* (2013.01); *H02K 2203/12* (2013.01)

(58) Field of Classification Search
USPC ...................................................... 310/52, 54
See application file for complete search history.

(56) References Cited

U.S. PATENT DOCUMENTS

| | | | | |
|---|---|---|---|---|
| 9,819,242 | B2* | 11/2017 | Kim | ........................ H02K 1/148 |
| 2004/0245882 | A1* | 12/2004 | Horie | ..................... H02K 3/325 |
| | | | | 310/194 |
| 2009/0184591 | A1 | 7/2009 | Hoshino et al. | |
| 2011/0215660 | A1* | 9/2011 | Goto | ........................ H02K 3/24 |
| | | | | 310/53 |
| 2012/0161555 | A1* | 6/2012 | Sawada | .................... H02K 3/24 |
| | | | | 310/54 |
| 2012/0263612 | A1* | 10/2012 | Matsuzaki | .......... F04D 13/0666 |
| | | | | 417/410.1 |
| 2014/0159540 | A1* | 6/2014 | Kim | ........................ H02K 1/148 |
| | | | | 310/264 |
| 2015/0207386 | A1* | 7/2015 | Garrard | .................... H02K 9/19 |
| | | | | 310/54 |
| 2017/0047822 | A1 | 2/2017 | Horii et al. | |
| 2017/0063201 | A1* | 3/2017 | Kitta | ........................ H02K 3/28 |
| 2019/0097499 | A1* | 3/2019 | Yim | ........................ H02K 1/20 |

FOREIGN PATENT DOCUMENTS

| | | |
|---|---|---|
| JP | 2016-208755 A | 12/2016 |
| KR | 10-1398458 B1 | 5/2014 |
| KR | 10-2016-0023314 A | 3/2016 |

OTHER PUBLICATIONS

Official Communication from the European Patent Office dated Dec. 5, 2019 for European Patent Application No. 18162520.3.

* cited by examiner

OIL CIRCULATION TYPE MOTOR AND ECHO VEHICLE INCLUDING THE SAME

CROSS-REFERENCE(S) TO RELATED APPLICATIONS

The present application claims priority to Korean Patent Application No. 10-2017-0123929, filed on Sep. 26, 2017, the entire contents of which is incorporated herein for all purposes by this reference.

BACKGROUND OF THE INVENTION

Field of the Invention

The present invention relates to a motor cooling structure, and particularly, to an echo vehicle including a motor in which cooling is performed by oil circulating through a coil.

Description of Related Art

In general, an echo vehicle may include a hybrid electric vehicle (HEV) using an engine and motor as a power source, an electric vehicle (EV) using a motor as a power source, and a fuel cell electric vehicle (FCEV) using a fuel cell as a power source. The HEV is divided into a plug-in hybrid electric vehicle (PHEV) to which a double clutch transmission (DCT) is applied and a transmission mounted electric device (TMED) to which a motor and a hybrid starter & generator (HSG) are separately applied.

Therefore, a motor used in an echo vehicle necessarily may include a stator and rotor and a cooling structure for cooling heat which is generated through a current applied to a coil and an eddy current caused by a counter electromotive voltage.

Examples of the cooling structure may include an oil spraying method for spraying auto transmission oil as cooling oil onto a rotor sleeve and a bobbin. The oil sprayed onto the bobbin cools the coil wound around the bobbin during operation. Thus, although the motor is driven for a long time, a thermal damage can be prevented while the performance of the motor is maintained.

Recently, however, the increasing demand for echo vehicles has requested the improvement in fuel efficiency and performance of an electric driving mode. The request for the performance improvement has increased the capacity of an electric motor through an output density improvement under a limited condition of an installation space within a vehicle. Thus, the improvement in cooling performance of a motor has been required according to the output density improvement.

The oil spraying method sprays oil only when the motor is rotated, but does not spray oil when the motor is stopped. Thus, under a vehicle condition including a gradient standstill or low-speed climbing condition in which the motor is driven at low speed and high power is required, the cooling performance is inevitably degraded.

Thus, to satisfy the request for improvement in cooling performance of the motor, an oil direct injection method using a cooling pipe through which oil directly flows to a coil may be combined with the oil spraying method. However, the use of the oil direction injection method is limited depending on a coil winding method of the motor.

For example, a distributed winding type motor has a structure in which coils protrude from both end portions of a stator. Thus, when the oil direct injection method is applied to the distributed winding type motor, oil injected by point oil injection at the top portions of the coils through a cooling pipe may directly flow to the coils, exhibiting sufficient cooling performance. However, a concentrated winding type motor has a structural limitation in that oil injected by point oil injection at the top portions of the coils does not come in uniform contact with the individual coils.

This is because, since the concentrated winding type motor has a parallel winding structure in which the coils are separately wound for the respective teeth of a stator, the oil injected by the point oil injection at the top portions of the coils through the cooling pipe cannot come in uniform contact with the individual coils, and thus has difficulties in cooling the whole coils. Therefore, the concentrated winding type motor is required to overcome the limitation of the oil spraying method in which the moving direction of the oil scattered from the rotor is blocked by the bobbin such that the scattered oil cannot be supplied to a side surface of the coil with a large area while coming in direct contact with the coil, and the limitation of the oil direction injection method in which oil does not come in uniform contact with the individual coils.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing an oil circulation type motor, which circulates oil which is filled while surrounding a stator coil, and thus significantly increases coil cooling efficiency, compared to an oil spraying method having low cooling performance and an oil direct injection method of which the use is limited depending on a coil winding method, and an echo vehicle including the same.

Various aspects of the present invention are directed to providing an oil circulation type motor which is configured for achieving an increase of capacity and an improvement of output density through higher cooling efficiency than the oil spraying method and the oil direct injection method, and thus suitable for a concentrated winding type motor configured for a TMED, and an echo vehicle including the same.

Other various aspects of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, a motor may include an oil circulating device having cooling oil chambers formed along the circumference of a stator core, wherein cooling oil is introduced into the cooling oil chambers, wets a stator coil wound around the stator core, and is then discharged from the cooling oil chambers.

The cooling oil may be discharged from the cooling oil chambers under the effect of the gravity, wherein the cooling oil chambers are formed at both sides of the stator core, respectively, while communicating with each other.

Each of the cooling oil chambers may have an inlet hole into which the cooling oil is introduced and an outlet hole from which the cooling oil is discharged. The inlet hole may be connected to an inlet pipe, and the inlet pipe may supply the cooling oil to a space around the stator core.

Each of the cooling oil chambers may be formed by a bobbin coupled to the stator core and located at the stator coil and a cooling case coupled to the bobbin to cover the stator coil. The bobbin and the cooling case may be fixed through an insertion structure or a clip structure. The bobbin may be coupled to the stator core while being located at each of teeth which are radially disposed and have the stator coil wound therearound, and the bobbins adjacent to each other in the radial arrangement of the teeth may be connected to each other through any one of a butt connection structure, a wedge connection structure, a round connection structure and an insertion connection structure.

The wedge connection structure may include an engagement between a wedge groove and a wedge protrusion, the round connection structure may include an engagement between a hemispherical groove and a hemispherical protrusion, and the insertion connection structure may include an engagement between a linear groove and a linear protrusion.

The stator core may form a stator which may include a support ring covering the stator core and a terminal holder coupled to the support ring to supply power to the stator coil through a terminal. The support ring may cover the external circumference of the stator core to expose the stator coil through the left and right sides of the stator core.

In accordance with various exemplary embodiments of the present invention, an echo vehicle may include: a motor having an oil circulating device which directly cools a stator coil of a stator using cooling oil while the cooling oil is introduced and discharged; and an oil pump pumping the cooling oil to supply to the oil circulating device.

The oil circulating device may circulate the cooling oil through the front and rear portions of the stator. The motor may include a concentrated winding type motor. The motor may include an inlet pipe connected to the oil pump through the oil coil circulating device in order to supply the cooling oil.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
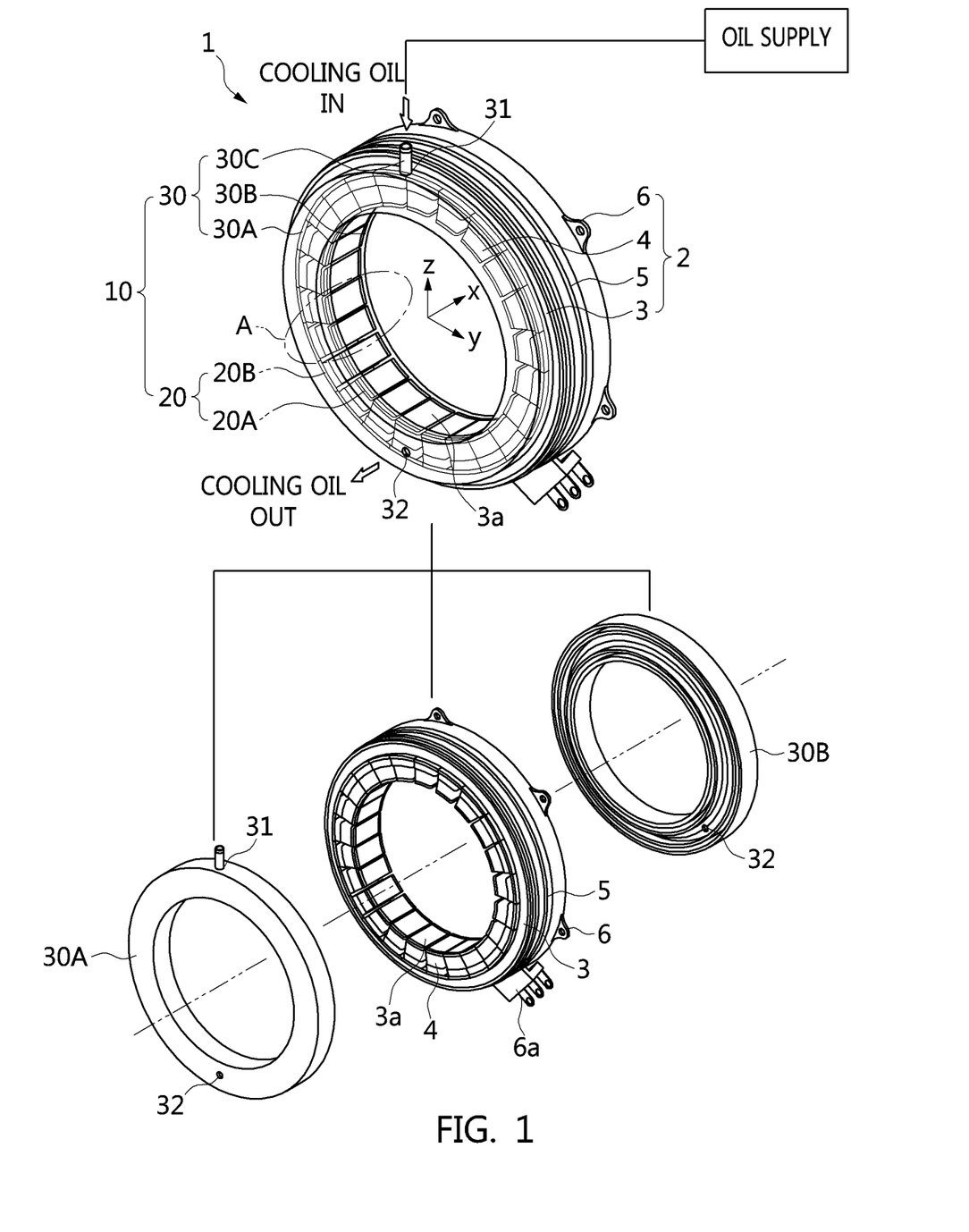
FIG. 1 is a schematic diagram illustrating a stator to which an oil circulation method is applied, in an oil circulation type motor In accordance with various exemplary embodiments of the present invention.

Referring to FIG. 1, a motor 1 includes a stator 2 to which power is applied and an oil circulating device 10, and performs a cooling operation on the stator 2 through an oil circulation type cooling structure.

The stator 2 includes a stator core 3, a stator coil 4, a support ring 5 and a terminal holder 6. The stator core 3 has teeth 3*a* disposed at even intervals in a radial shape, the stator coil 4 is wound around each of the teeth 3*a* such that a current flows therethrough, the support ring 5 is coupled to the stator core 3 while surrounding the stator core 3, and the terminal holder 6 is coupled to the rear of the support ring 5 to supply power to a terminal 6*a*. Therefore, the stator 2 is coupled to a rotor (refer to FIG. 7) in an internal space of the stator core 3.

The oil circulating device 10 includes a bobbin 20 having two pairs of internal and external bobbins 20A and 20B, a cooling case 30 having front and rear bobbin covers 30A and 30B, and cooling oil circulation holes 31 and 32.

For example, one pair of internal and external bobbins 20A and 20B are coupled to the front bobbin cover 30A at the front of the stator coil 4, and the other pair of internal and external bobbins 20A and 20B are coupled to the rear bobbin cover 30B at the rear of the stator coil 4.

For example, the cooling oil circulation holes are divided into an inlet hole 31 and an outlet hole 32. The inlet hole 31 is configured as an entrance through cooling oil is introduced into the one pair of internal and external bobbins 20A and 20B and a front cooling oil filled space of the front bobbin cover 30A, and the outlet hole 32 is configured as an exit through which cooling oil is discharged from the front cooling oil filled space after passing through the other pair of internal and external bobbins 20A and 20B and a rear cooling oil filled space of the rear bobbin cover 30B. The inlet hole 31 is connected to the front bobbin cover 30A through an inlet pipe 30C such that cooling oil can be directly or intensively supplied to the space around the stator 2 or the outside of the motor 1 through an oil pump (refer to FIG. 8) connected to the inlet pipe 30C. In the instant case, the outlet hole 32 is formed in the front bobbin cover 30A. However, the same outlet hole 32 may also be formed in the rear bobbin cover 30B.

As a result, the oil circulating device 10 forms a cooling oil circulation flow which enters the stator core 3 from the top portion of the stator core 3, circulates through the front and rear portions of the stator core 3, collects at the bottom portion of the stator core 3 under the effect of the gravity, and then escapes to the outside of the stator core 3. While the cooling oil circulates, the stator coil 4 is cooled by the cooling oil. The oil circulating device 10 brings the cooling oil in direct contact with the stator coil 4 through the oil circulation method in which the front and rear cooling oil filled spaces (that is, front and rear cooing oil chambers 39-1 and 39-2 of FIG. 2) are formed at the front and rear of the stator 2 along the circumference of the stator 2. Therefore, the oil circulating device 10 overcomes the limitations of the oil spraying method having low cooling performance and the oil direct injection method of which the use is limited depending on a coil winding method.

Therefore, the motor 1 can significantly increase cooling efficiency through the oil circulating device 10, and thus contribute to achieving an increase of capacity and an improvement of output density, which are required by a concentrated winding type motor configured for a TMED.

Figure 2:
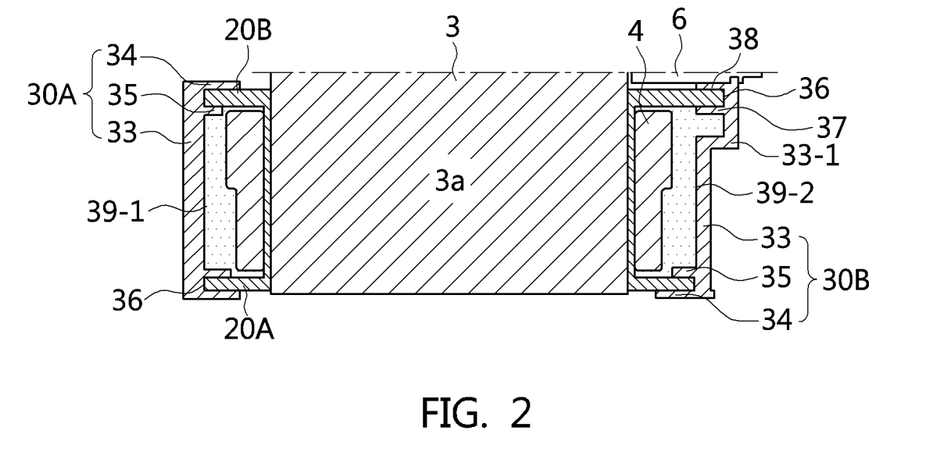
FIG. 2 is a cross-sectional view illustrating that an oil circulation structure applied to the stator in accordance with the exemplary embodiment of the present invention is sealed by a bobbin and a cooling chamber.

FIG. 2 illustrates that the front and rear cooling oil filled spaces of the oil circulating device 10 are formed at the front and rear of the stator coil 4 wound around each of the teeth 3a of the stator core 3, and serve as the front and rear cooling oil chambers 39-1 and 39-2.

The one pair of internal and external bobbins 20A and 20B cover each of the teeth 3a of the stator core 3 in the inward and outward direction at the front of the stator coil 4 such that the stator coil 4 forms a front exposed portion, and the other pair of internal and external bobbins 20A and 20B cover the tooth 3a of the stator core 3 in the inward and outward direction at the rear of the stator coil 4 such that the stator coil 4 forms a rear exposed portion.

The front bobbin cover 30A is coupled to a front position of the stator coil 4 to cover the front exposed portion of the stator coil 4, and the rear bobbin cover 30B is coupled to a rear position of the stator coil 4 to cover the rear exposed portion of the stator coil 4.

Therefore, the front bobbin cover 30A forms the front cooling oil chamber 39-1 covering the front side of the stator coil 4 with the one pair of internal and external bobbins 20A and 20B, and the rear bobbin cover 30B forms the rear cooling oil chamber 39-2 covering the rear side of the stator coil 4 with the other pair of internal and external bobbins 20A and 20B. As a result, the stator coil 4 is submerged under cooling oil, and comes in direct contact with the cooling oil.

The front bobbin cover 30A and the external bobbin 20B are fixed to each other through insertion connection, and the rear bobbin cover 30B and the external bobbin 20B are also fixed to each other through insertion connection.

For example, the front bobbin cover 30A includes a case body 33 and a case fixing groove 36. The case body 33 covers the stator coil 4 to form the front cooling oil chamber 39-1, and the case fixing groove 36 is formed by external and internal flanges 34 and 35 protruding from the case body 33 with a space provided therebetween, such that the external bobbin 20B is inserted and fixed to the case fixing groove 36. The rear bobbin cover 30B includes a case body 33, a case protrusion body 33-1, a case fixing groove 36, a fixing protrusion 38 and an extended chamber 37. The case body 33 covers the stator coil 4 to form the rear cooling oil chamber 39-2, the case protrusion body 33-1 protrudes from the case body 33, the case fixing groove 36 is formed by external and internal flanges 34 and 35 protruding from the case body 33 and the case protrusion body 33-1 with a space provided therebetween, such that the internal bobbin 20A is inserted and fixed to the case fixing groove 36, the fixing protrusion 38 protrudes from the case protrusion body 33-1 and is inserted into a groove of the terminal holder 6 to strengthen a fixing force, and the extended chamber 37 is formed under the case fixing groove 36 in the case protrusion body 33-1, forming a cooling oil filled space.

Figure 3:
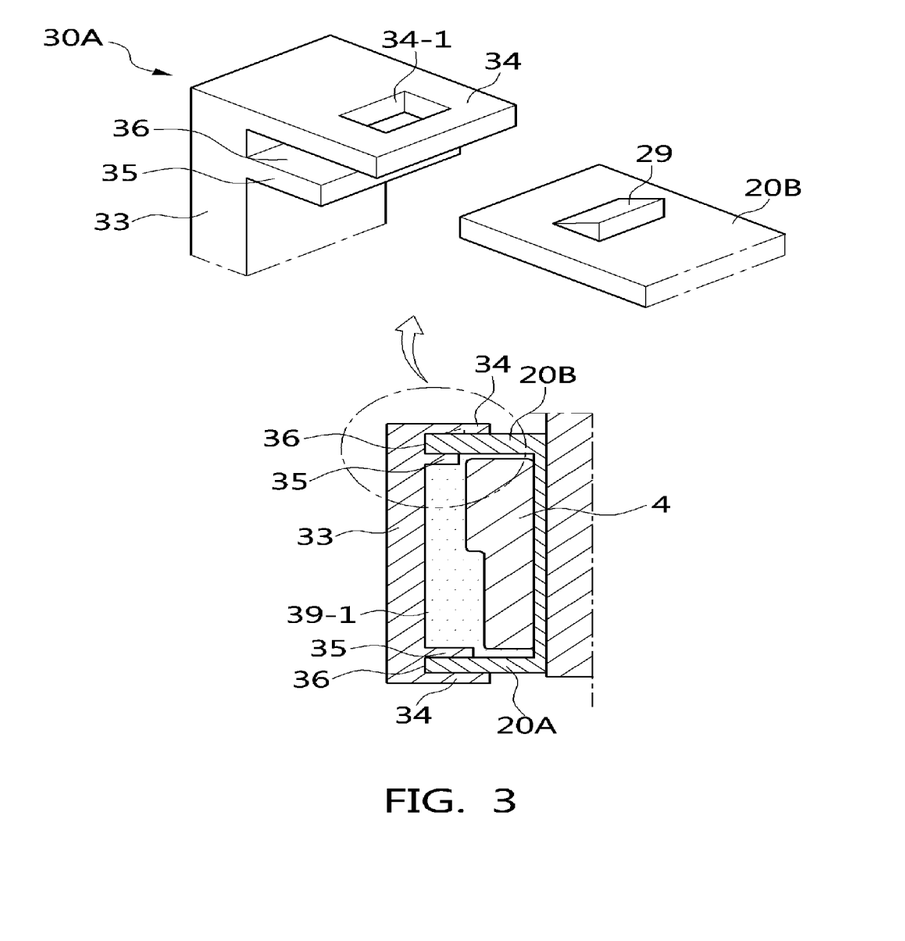
FIG. 3 illustrates an example in which a bobbin cover of a cooling case for the sealed oil circulation structure in accordance with the exemplary embodiment of the present invention is connected through a clip connection structure modified from an insertion connection structure.

FIG. 3 illustrates a clip connection structure between the front bobbin cover 30A and the external bobbin 20B, as a modification of the insertion connection structure of FIG. 2.

As illustrated in FIG. 3, a clip groove 34-1 is formed in the external flange 34 of the front bobbin cover 30A, and a clip protrusion 29 having a right-angled triangle cross-sectional shape protrudes from the external bobbin 20B. Therefore, when the external bobbin 20B and the front bobbin cover 30A are coupled to each other, the external bobbin 20B is inserted into the case fixing groove 36 between the external flange 34 and the internal flange 35, and the clip protrusion 29 is coupled to the clip groove 34-1. Thus, a clip fixing force as well as the insertion fixing force is formed to further strengthen the fixed state.

Figure 4:
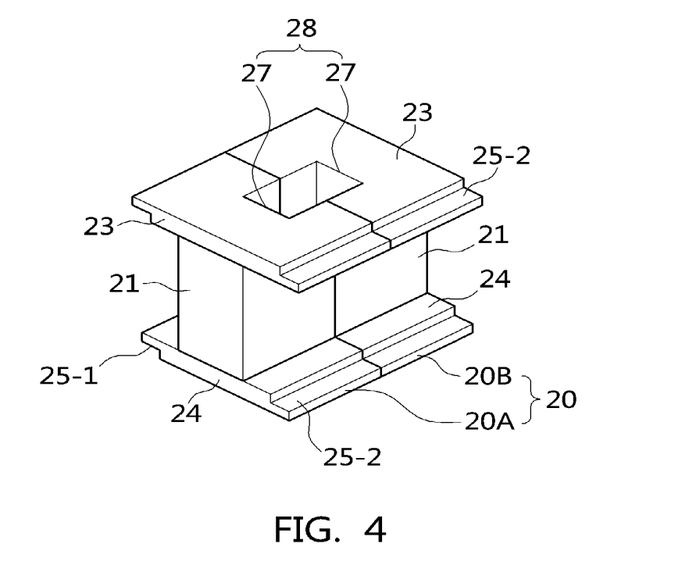
FIG. 4 illustrates internal and external bobbins forming the bobbin in accordance with the exemplary embodiment of the present invention.

FIG. 4 illustrates the structures of the internal and external bobbins 20A and 20B forming the bobbin 20. As illustrated in FIG. 4, each of the internal and external bobbins 20A and 20B includes a bobbin body 21, upper and lower bobbin flanges 23 and 24, a coil seating surface 27, a coil chamber 28 and the clip protrusion 29.

For example, the bobbin body 21 is coupled in the lateral direction of one tooth 3a to be positioned at the stator coil 4 wound around the tooth 3a in the internal space of the stator core 3. The upper bobbin flange 23 is formed at the top portion of the bobbin body 21 and has a larger length than the width of the bobbin body 21, and the lower bobbin flange 24 is formed at the bottom portion of the bobbin body 21 and has the same length as the upper bobbin flange 23. The top portion of the bobbin body 21 is defined as facing the front of the stator coil 4, and the bottom portion of the bobbin body 21 is defined as facing the rear of the stator coil 4.

For example, the coil seating surface 27 is formed as a groove in the bobbin body 21 and the upper and lower bobbin flanges 23 and 24, and the coil chamber 28 is formed by the bobbin body 21 of the internal bobbin 20A and the bobbin body 21 of the external bobbin 20B, which are brought in contact with each other, such that the coil seating surface 27 of the internal bobbin 20A and the coil seating surface 27 of the external bobbin 20B cover the stator coil 4 wound around one tooth 3A inside and outside. Therefore, the top portion of the coil chamber 28 is defined as facing the front of the stator coil 4, and the bottom portion of the coil chamber 28 is defined as facing the rear of the stator coil 4.

Figure 5:
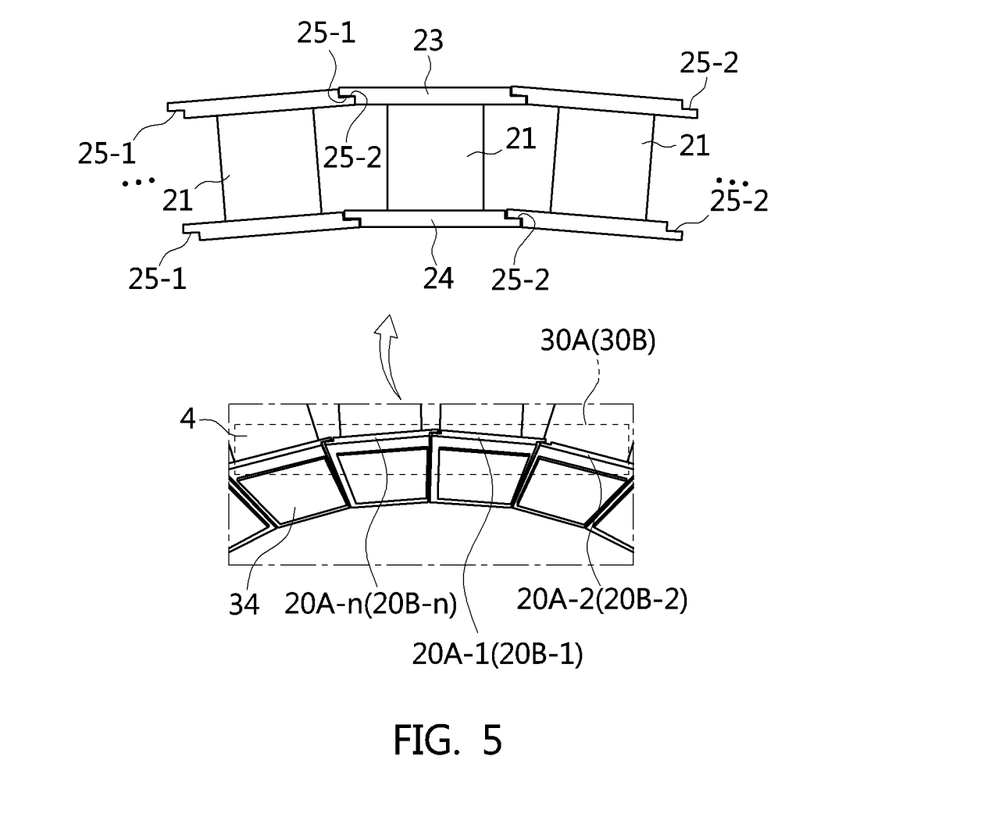
FIG. 5 illustrates a butt connection structure of the bobbin for the sealed oil circulation structure in accordance with the exemplary embodiment of the present invention.
Figure 6:
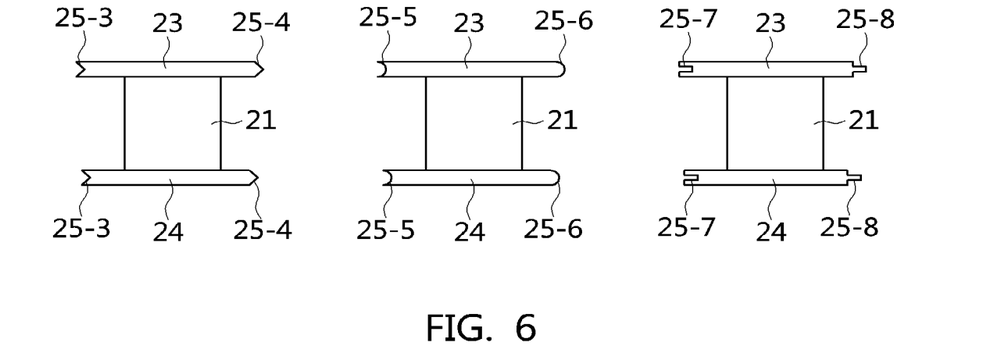
FIG. 6 illustrates a wedge connection structure, a round connection structure and an insertion connection structure for the bobbin in accordance with the exemplary embodiment of the present invention.

FIG. 5 and FIG. 6 illustrate internal and external bobbin elements 20A-1 to 20A-$n$ and 20B-1 to 20B-$n$ which form a circular shape when the internal and external bobbins 20A and 20B coupled to the stator coil 4 wound around each of the teeth 3a of the stator core 3 are completely disposed. Here, n is an integer equal to or greater than 2. FIG. 5 and FIG. 6 illustrate that the arrangement of the internal and external bobbin elements 20A-1 to 20A-n and 20B-1 to 20B-n is achieved through a butt connection method, a wedge connection method, a round connection method and an insertion connection method.

FIG. 5 illustrates the butt connection method which achieves the arrangement through connections between left and right butt end portions 25-1 and 25-2 of the internal and external bobbin elements 20A-1 to 20A-n and 20B-1 to 20B-n. As illustrated in FIG. 5, each of the upper and lower bobbin flanges 23 and 24 of the internal and external bobbin elements 20A-1 to 20A-n and 20B-1 to 20B-n has a left butt end portion 25-1 formed as one end portion and a right butt end portion 25-2 formed as the other end portion. For example, when the left butt end portion 25-1 has an inversed L-shaped cross-section, the right butt end portion 25-2 has an L-shaped cross-section.

Therefore, when the internal and external bobbin elements 20A-1 to 20A-n and 20B-1 to 20B-n are successively disposed, the left and right butt end portions 25-1 and 25-2 of the first internal and external bobbin elements 20A-1 and 20B-1, the second internal and external bobbin elements 20A-2 and 20B-2 and the nth internal and external bobbin elements 20A-n and 20B-n are coupled to each other through the L-shaped and inversed L-shaped cross-sectional structures. As a result, bobbin gaps formed by the connections between the respective bobbin bodies 21 forming the internal and external bobbin elements 20A-1 to 20A-n and 20B-1 to 20B-n are blocked by the arrangement structure constructed through the butt connection method using the left and right butt end portions 25-1 and 25-2. Thus, cooling oil stored in the front and rear cooling oil filled chambers 39-1 and 39-2 does not leak through the bobbin gaps.

FIG. 6 illustrates that the upper and lower bobbin flanges 23 and 24 of the internal and external bobbin elements 20A-1 to 20A-n and 20B-1 to 20B-n have left and right wedge end portions 25-3 and 25-4, left and right round end portions 25-5 and 25-6 or left and right insertion end portions 25-7 and 25-8. As illustrated in FIG. 6, when the left wedge end portion 25-3 of the left and right wedge end portions 25-3 and 25-4 has a wedge groove-shaped cross-section, the right wedge end portion 25-4 has a wedge protrusion-shaped cross-section. Furthermore, when the left round end portion 25-5 of the left and right round end portions 25-5 and 25-6 has a hemispherical groove-shaped cross-section, the right round end portion 25-6 has a hemispherical protrusion-shaped cross-section. Furthermore, when the left insertion end portion 25-7 of the left and right insertion end portions 25-7 and 25-8 has a linear groove-shaped cross-section, the right insertion end portion 25-8 has a linear protrusion-shaped cross-section.

Therefore, each of the wedge groove/wedge protrusion-shaped cross-sectional structure, the hemispherical groove/hemispherical protrusion-shaped cross-sectional structure and the linear groove/linear protrusion-shaped cross-sectional structure can also block the bobbin gaps formed through the connections between the respective bobbin bodies 21 forming the internal and external bobbin elements 20A-1 to 20A-n and 20B-1 to 20B-n. Thus, cooling oil stored in the front and rear cooling oil chambers 39-1 and 39-2 does not escape through the bobbin gaps.

Figure 7:
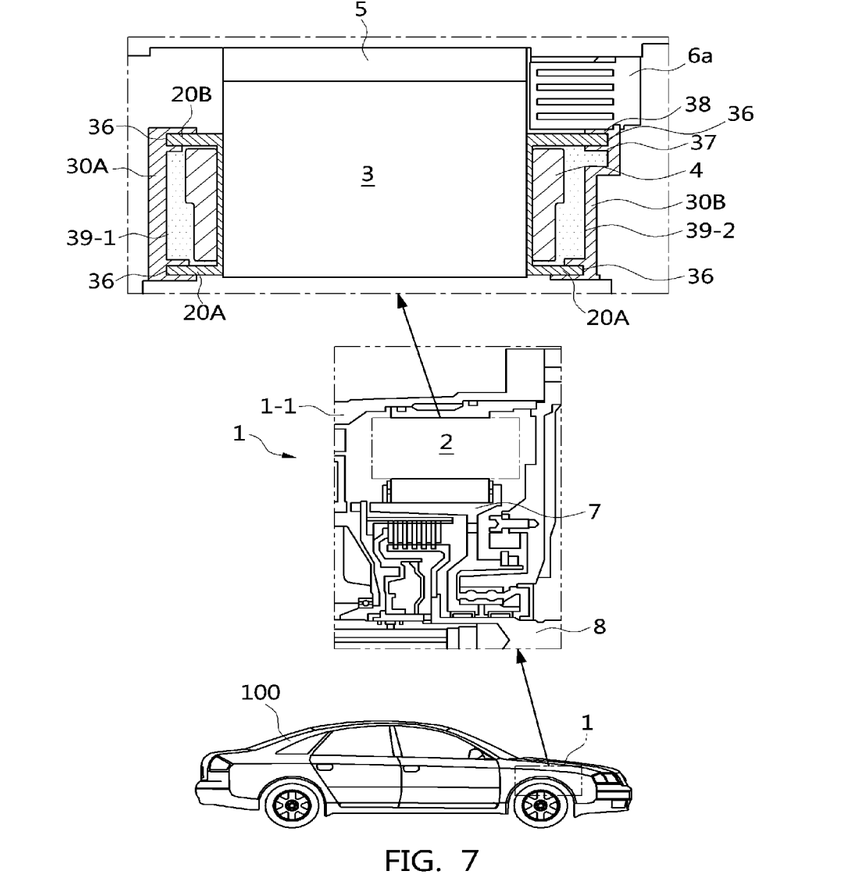
FIG. 7 illustrates an echo vehicle to which the oil circulation type motor in accordance with the exemplary embodiment of the present invention is applied.
Figure 8:
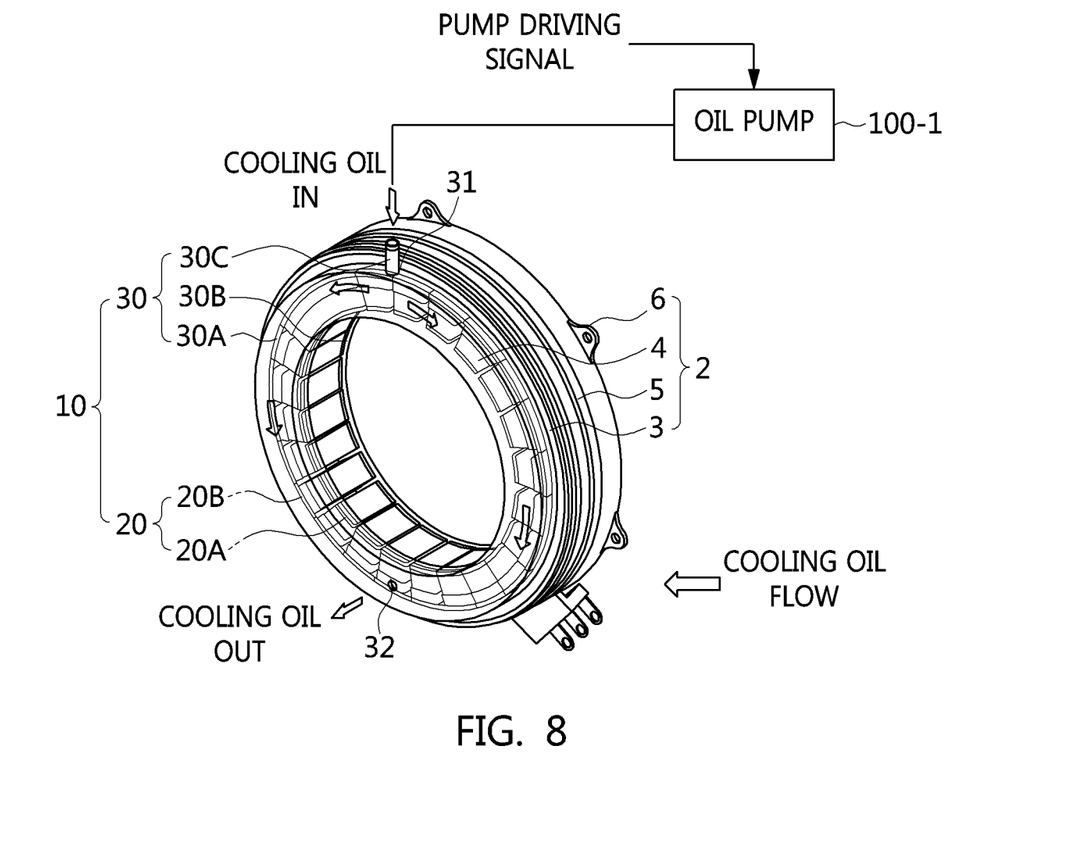
FIG. 8 illustrates an operation state that the motor in accordance with the exemplary embodiment of the present invention cools a coil through the oil circulation method.

FIG. 7 and FIG. 8 illustrate an example in which the motor 1 including the oil circulating device 10 is applied as a driving motor of a vehicle 100. In the instant case, an echo vehicle is applied as the vehicle 100.

Referring to FIG. 7, the vehicle 100 includes the motor 1 and an oil pump 100-1.

The oil pump 100-1 pumps auto transmission fluid supplied to a transmission and circulates the auto transmission fluid as cooling oil through the motor 1, or pumps cooling oil stored in the motor 1 and circulates the cooling oil through the motor 1.

The motor 1 may include cooling oil stored therein, or receive auto transmission fluid as cooling oil. The motor 1 includes a stator 2, a rotor 7 and a rotation shaft 8 which are embedded in a motor housing 1-1 which is to be mounted in the vehicle 100. The motor 1 may be connected to an engine clutch. For example, a current is supplied to the stator 2, the rotor 7 is rotated by the current supplied to the stator 2, and the rotation shaft 8 is rotated with the rotor 7 and outputs a motor torque.

The stator 2 includes the stator core 3, the stator coil 4, the support ring 5 and the terminal holder 6, which are described with reference to FIGS. 1 to 6, and the oil circulating device 10 is applied to the stator 2. Therefore, the motor 1 cools the stator coil 4 through the oil circulation method using the oil circulating device 10.

FIGS. 2 and 8 illustrate the operation state that the oil circulating device 10 cools the stator coil 4 through the oil circulation method during the operation of the motor 1.

As illustrated in FIGS. 2 and 8, the front cooling oil chamber 39-1 is formed by the front bobbin cover 30A and the one pair of internal and external bobbins 20A and 20B, which cover the front side of the stator coil 4, and the rear cooling oil chamber 39-2 is formed by the rear bobbin cover 30B and the other pair of internal and external bobbins 20A and 20B, which cover the rear side of the stator coil 4.

As such, when operation oil (transmission) or cooling oil is pumped inside or outside the motor 1 by the oil pump 100-1, the cooling oil is introduced into the front cooling oil chamber 39-1 through the inlet hole 31 to which the inlet pipe 30C is connected. As such, the cooling oil flows into the rear cooling oil chamber 39-2 while filling the front cooling oil chamber 39-1. Thus, the front and rear cooling oil chambers 39-1 and 39-2 are filled with the cooling oil through the flow of cooling oil. Therefore, the stator coil 4 surrounded by the front and rear cooling oil chambers 39-1 and 39-2 comes in direct contact with the cooling oil.

As such, when the front and rear cooling oil chambers 39-1 and 39-2 are filled with the cooling oil such that the stator coil 4 is submerged under the cooling oil, the cooling oil collects in the outlet hole 32 located under the stator core 3 under the effect of the gravity. The cooling oil escapes from the stator core 3 through the outlet hole 32, fills the internal to the motor 1, and is then circulated through the motor 1 by a pumping operation of the oil pump 100-1. In the instant case, when the outlet hole 32 is also formed in the rear bobbin cover 30B, the cooling oil may be discharged through the rear cooling oil chamber 39-2.

Therefore, according to the oil circulation method of the oil circulating device 10, a cooling oil circulation flow may occur regardless of the rotation of the motor 1, while the stator coil 4 is always submerged under the cooling oil. Thus, the oil circulation method can maintain high cooling performance even when the motor is stopped or under a vehicle condition including a gradient standstill or low-speed climbing condition in which the motor is driven at low speed and high power is required.

Figure 9:
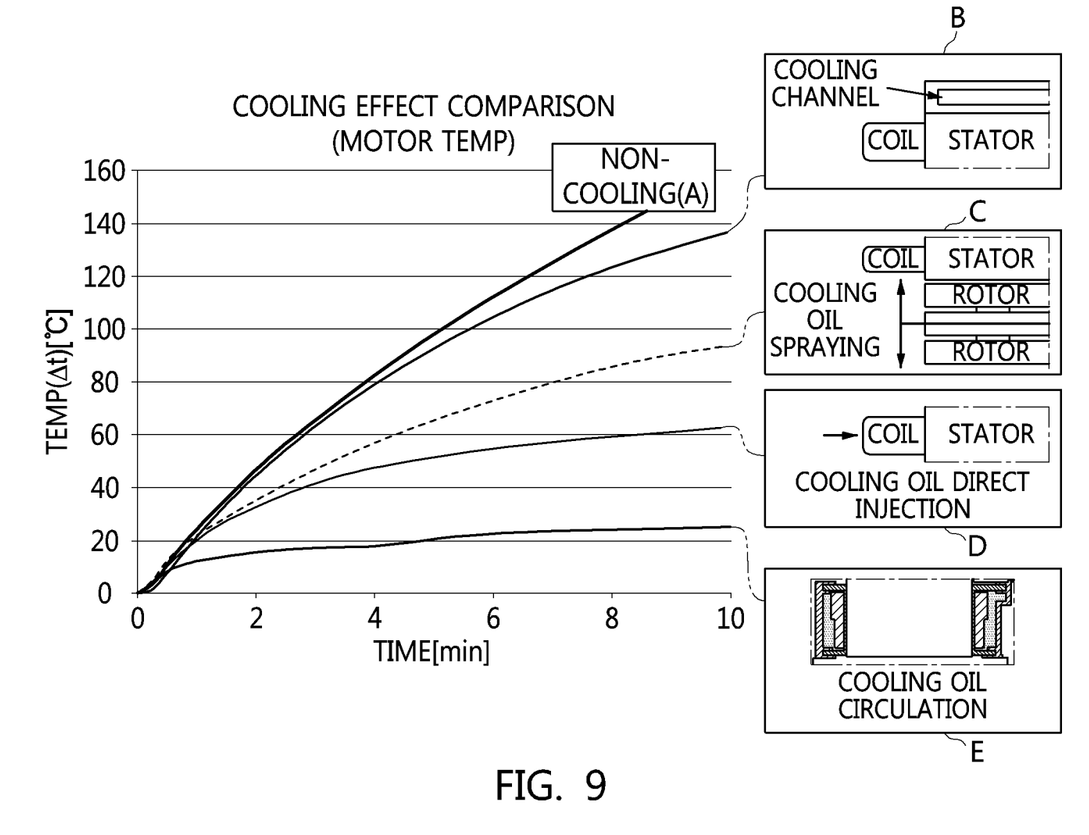
FIG. 9 is a cooling performance comparison graph showing a cooling effect of the oil circulation method in accordance with the exemplary embodiment of the present invention, compared to other methods.

FIG. 9 is a cooling performance comparison graph showing a cooling effect of the oil circulation method E of the oil circulating device 10 for the motor 1, compared to those of an oil cooling jacket method B, an oil spraying method C and an oil direct injection method D.

The time-temperature graph of FIG. 9 shows the motor cooling efficiencies of the respective methods; compared to a state in which cooling is not performed (referred to as non-cooling state). Among them, the oil circulation method E has the highest motor cooling efficiency, and the motor cooling efficiency decreases in order of the oil direct injection method D, the oil spraying method C and the oil cooling jacket method B.

The oil circulation method E having high motor cooling efficiency may be effectively applied to the concentrated winding type motor in which the moving direction of oil scattered from the rotor 7 is inevitably blocked by the bobbins 20A and 20B due to the parallel winding structure in which the stator coil 4 is separately disposed for each tooth 3*a* of the stator core 3. Therefore, the concentrated winding type motor to which the oil circulation method E is applied can significantly reduce a lot of efforts required for controlling the temperature of a drive motor of an echo vehicle.

As described above, the oil circulation type motor of the echo vehicle in accordance with the exemplary embodiment of the present invention may include the cooling oil chambers 39-1 and 39-2 through which cooling oil pumped by the oil pump 100-1 is introduced and discharged, the cooling oil chambers 39-1 and 39-2 being formed along the circumference of the stator core 3. Furthermore, the oil circulation type motor includes the oil circulating device 10 which allows the cooling oil to enter the cooling oil chambers 39-1 and 39-2, wet the stator coil 4 wound around the stator core 3, and escape from the cooling oil chambers 39-1 and 39-2. Therefore, since the oil circulation type motor can exhibit higher cooling efficiency than the oil cooling jacket method, the oil spraying method and the oil direct injection method, the capacity can be improved while the output density is improved. The oil circulation method of the oil circulating device 10 can be effectively applied to a concentrated winding type motor configured for a TMED.

In accordance with the exemplary embodiments of the present invention, the oil circulation type motor and the vehicle including the same may achieve the following effects.

First, the oil circulation type motor can exhibit a motor cooling effect which is twice or more higher than the oil spraying method or the oil direct injection method. Second, since the whole coils of the motor is completely surrounded by the cooling channels (or cooling chambers), the whole coils can be uniformly cooled, compared to the oil direct injection method or a method for partially submerging a coil under oil. Third, a reduction of the cooling performance does not occur even when the motor is not rotated, unlike the oil spraying method. Fourth, a simple cover structure for the bobbins and the terminal holder is applied to form the cooling chambers (or cooling channels) including the coil. Thus, the cooling structure can be constructed at lower cost than the oil spraying method or the oil direct injection method which is an indirect cooling method. Fifth, oil introduced into the upper oil hole is automatically discharged through the lower oil hole under the effect of the gravity. Thus, since the oil circulation type motor utilizes a smaller oil pressure than the oil direct injection method requiring a high oil pressure, the capacity of the oil pump can be minimized, and the manufacturing cost can be reduced. Sixth, since the oil circulation type motor has higher cooling efficiency than the oil spraying method and the oil direct injection method, the oil circulation type motor can be applied to a concentrated winding type motor which requires an increase of capacity and an improvement of output density to be applied to a TMED For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the claims appended hereto and their equivalents.

What is claimed is:

1. A motor comprising an oil circulating device having a front cooling oil chamber and a rear cooling oil chamber of cooling oil chambers formed along a circumference of a stator core, wherein teeth of the stator core are radially disposed and have a stator coil wound therearound, and bobbins including an engagement structure are coupled to the stator core, wherein the bobbins adjacent to each other in a radial arrangement of the teeth are connected to each other by the engagement structure in a circumferential direction of the state core, and wherein the engagement structure includes one of a butt connection structure a wedge connection structure in which the end of each bobbin includes a wedge end portion to be coupled to each other, a round connection structure in which the end of each bobbin includes a round end portion to be coupled to each other, and an insertion connection structure in which the end of each bobbin includes an insertion end portion to be coupled to each other, wherein cooling oil is introduced into the front cooling oil chamber and the rear cooling oil chamber, wets the stator coil wound around the stator core, and is then discharged from the front cooling oil chamber and the rear cooling oil chamber, wherein each of the front cooling oil chamber and the rear cooling oil chamber is formed by the bobbins coupled to the stator core and located at the stator coil and a front bobbin cover and a rear bobbin cover of a cooling case directly connected to the bobbins to cover the stator coil, wherein the bobbins include internal bobbins and external bobbins, wherein the front bobbin cover forms the front cooling oil chamber covering a front side of the stator coil with one pair of the internal and external bobbins, and the rear bobbin cover forms the rear cooling oil chamber covering a rear side of the stator coil with another pair of the internal and external bobbins, wherein the butt connection structure includes a left butt end portion in one of the bobbins and having a L-shaped cross-sectional structure, and a right butt end portion in another of the bobbins and having an inversed L-shaped cross-sectional structure, wherein the L-shaped cross-sectional structure of the left butt end portion and the inversed L-shaped cross-sectional structure of the right butt end portion are coupled to each other, and wherein the oil circulating device further includes a clip structure fixing the bobbins and the cooling case.

2. The motor of claim 1, wherein the cooling oil is discharged from the front cooling oil chamber and the rear cooling oil chamber under an effect of the gravity.

3. The motor of claim 1, wherein the front cooling oil chamber and the rear cooling oil chamber are formed at a side and an opposite side of the stator core, respectively, while fluidically-communicating with each other.

4. The motor of claim 1, wherein each of the front cooling oil chamber and the rear cooling oil chamber have an inlet hole into which the cooling oil is introduced and an outlet hole from which the cooling oil is discharged.

5. The motor of claim 4, wherein the inlet hole is connected to an inlet pipe, and the inlet pipe supplies the cooling oil to a space around the stator core.

6. The motor of claim 1, wherein the oil circulating device further includes an insertion structure fixing the bobbins and the cooling case.

7. The motor of claim 1, wherein the wedge end portion of the wedge connection structure includes a wedge groove or a wedge protrusion, the round end portion of the round connection structure includes a hemispherical groove or a hemispherical protrusion, and the insertion end portion of the insertion connection structure includes a linear groove or a linear protrusion.

8. The motor of claim 1, wherein the stator core forms a stator which includes a support ring covering the stator core and a terminal holder coupled to the support ring to supply power to the stator coil through a terminal.

9. The motor of claim 8, wherein the support ring covers an external circumference of the stator core to expose the stator coil through predetermined sides of the stator core.

* * * * *